United States Patent [19]

Allard et al.

[11] Patent Number: 5,422,656
[45] Date of Patent: Jun. 6, 1995

[54] PERSONAL COMMUNICATOR HAVING IMPROVED CONTRAST CONTROL FOR A LIQUID CRYSTAL, TOUCH SENSITIVE DISPLAY

[75] Inventors: David J. Allard, Boynton Beach; Brent A. Beatty, Boca Raton; Francis J. Canova, Jr., Boynton Beach; Bradley J. DeBauche, Delray Beach; Danile M. Hsieh, Coral Springs; Debra A. G. Johnson, Fort Lauderdale; Charles S. Lanier, Delray Beach; James R. Lewis, Coconut Creek; Byron K. Tiller, Boca Raton; William Villafana, Davie; Raymond L. Yee, Coral Springs, all of Fla.

[73] Assignee: International Business Machines Corp., Armonk, N.Y.

[21] Appl. No.: 146,342

[22] Filed: Nov. 1, 1993

[51] Int. Cl.6 .................................... G09G 3/22
[52] U.S. Cl. ........................ 345/173; 345/63; 345/147
[58] Field of Search ............ 345/77, 63, 89, 147, 345/173, 179; 178/18-20; 348/734, 738, 761, 790, 791, 794

[56] References Cited

U.S. PATENT DOCUMENTS

| 5,029,982 | 7/1991  | Nash ............... 350/331 T |
| 5,119,204 | 6/1992  | Hashimoto et al. ...... 348/794 |
| 5,148,155 | 9/1992  | Martin et al. ......... 345/179 X |
| 5,166,666 | 11/1992 | Tanaka ............... 345/179 |
| 5,260,697 | 11/1993 | Barrett et al. ........ 345/179 X |

FOREIGN PATENT DOCUMENTS 0354703  2/1990  European Pat. Off. .
9104461  4/1991  WIPO .

Primary Examiner—Ulysses Weldon
Attorney, Agent, or Firm—George E. Grosser; Douglas R. McKechnie

[57] ABSTRACT

A personal communicator has a touch sensitive overlay coupled with a liquid crystal display (LCD). The communicator has two external (non-screen) up/down buttons for adjusting the volume of a cellular phone speaker. These volume buttons are also used to allow the user to adjust contrast. In accordance with one operation, contrast is adjusted in response to the user touching a predetermined area of the screen at the same time as one of the up or down buttons is actuated. In accordance with another operation, contrast is adjusted in response to the user first pressing both speaker volume buttons to enter a contrast adjustment mode, and thereafter pressing one or the other of such buttons, to increase or decrease contrast as desired.

15 Claims, 5 Drawing Sheets

PERSONAL COMMUNICATOR HAVING IMPROVED CONTRAST CONTROL FOR A LIQUID CRYSTAL, TOUCH SENSITIVE DISPLAY

RELATED APPLICATIONS

The following applications are all assigned to the assignee of this invention, and cover different inventions related to a common development project:

(1) Application serial number 07/976,127, filed Nov. 13, 1992, for "NAVIGATOR APPLICATION FOR PERSONAL COMMUNICATOR" by B A. Beatty et al (2) Application serial number, filed concurrently herewith, for "PERSONAL COMMUNICATOR HAVING IMPROVED ZOOM AND PAN FUNCTIONS FOR EDITING IMAGES ON TOUCH SENSITIVE DISPLAY", by D. J. Allard et al.

(3) Application serial number, filed concurrently herewith, for "PERSONAL COMMUNICATOR HAVING COLLAPSIBLE KEYBOARD FOR EDITING DOCUMENTS ON TOUCH SENSITIVE DISPLAY", by D. J. Allard et al.

The above related application (1) deals primarily with an operating system called the "Navigator" which manages screen displays and controls switching between the different communication and data processing functions. Related application (2) deals with managing the data presented on the screen of on a relatively small touch sensitive display and providing novel pan and zoom functions for viewing portions of a relatively large image. Related application (3) deals with managing a relatively small touch sensitive display in which a simulated collapsible keyboard is used to edit/enter information in a data viewing area. The present application deals with an improved contrast control for a touch sensitive display.

BACKGROUND OF THE INVENTION

The invention was designed as part of a personal communicator that combines a cellular phone, a data and fax modem, and a data processing system, into a mobile, compact, lightweight, battery operated, handheld device having a variety of data processing and communication functions. These functions include operating the device as a standard cellular phone; a calendar showing a list of things to do at various times; an address book for organizing names, addresses and phone numbers; a calculator; a note pad allowing text entry and editing; and a communication device for fax, E-mail, and various data bases and services.

The personal communicator is in the form of a handset having an earphone or speaker at one end, a microphone at the other end, and a small touchscreen display between the speaker and the microphone. The display has a touch or pressure sensitive overlay, and a fine pitch liquid crystal display (LCD) operated as a standard CGA display with a resolution of 640×200 pixels. The touchscreen display provides a graphic user interface, input/output device for a variety of functions or applications.

The general problem, which the invention addresses, is that due to the mobility of the communicator, the LCD may be exposed to wide temperature extremes which affect the LCD contrast. Extreme cold renders the liquid crystal material opaque and extreme heat makes the material transparent. Thus, some form of contrast control is needed to allow the user to adjust the contrast of the LCD to compensate for the extreme temperature effects. Such a control should also be usable to allow a user to adjust contrast to suit personal preferences.

This general problem is known in the art, but the solutions differ as to how contrast control is provided. U. S. Pat. No. 5,029,982-Nash discloses an "LCD CONTRAST ADJUSTMENT SYSTEM" for a portable computer. The system includes a user adjustable power supply which the user sets to achieve a desired contrast. A temperature sensor is used to generate a correction voltage that is added to the power supply voltage to maintain the user setting. The patent is silent as to the apparatus for adjusting the power supply. Presumably, adjustment is done by a standard knob or external, manually actuated slider or rotary knob.

The problem becomes more complex due to a design restraint of limiting the external controls to the three buttons discussed above and not allowing any additional external button or knob that would be dedicated to contrast control. Furthermore, the use of the touchscreen display itself to provide the contrast adjustment, appears to be ruled out since any simulated control buttons may not be visible under the extreme temperature conditions.

SUMMARY OF THE INVENTION

One of the objects of the invention is to provide an improved contrast control for an touchscreen display having an LCD subject to use under a wide range of temperature conditions, including those which may eliminate any visible contrast.

Another object of the invention is to provide a mobile personal communicator with an improved LCD-contrast control.

A further object of the invention is to provide a personal communicator, which includes a cellular phone having external buttons for adjusting speaker volume, with a touchscreen display having an LCD and novel contrast control means.

Still another object of the invention is to provide a personal communicator of the type discussed above, with a novel contrast control that solves and overcomes the problems noted above.

A still further object of the invention is to provide a personal communicator, including a cellular phone and a touchscreen display, with means for adjusting LCD contrast in response to the user pressing an external phone speaker volume control button and a simulated HELP screen control button.

Another object of the invention is to provide a personal communicator, including a cellular phone and a touchscreen display, with means for adjusting LCD contrast in response to the user pressing external phone speaker volume control buttons in a particular sequence or fashion.

Briefly, in accordance with the invention, a personal communicator has a touch sensitive overlay coupled with a liquid crystal display (LCD). The communicator has two external (non-screen) up/down buttons for adjusting the volume of a cellular phone speaker. These volume buttons are also used to allow the user to adjust contrast. In accordance with one embodiment of the invention, contrast is adjusted in response to the user touching a predetermined area of the screen at the same time as one of the up or down buttons is actuated. In accordance with another embodiment of the invention, contrast is adjusted in response to the user first pressing both speaker volume buttons to enter a contrast adjustment mode, and thereafter pressing one or the other of such buttons, to increase or decrease contrast as desired.

DRAWINGS

Other objects and advantages of the invention will be apparent from the following description taken in connection with the accompanying drawings wherein.

DETAILED DESCRIPTION

General System Organization

Figure 1:
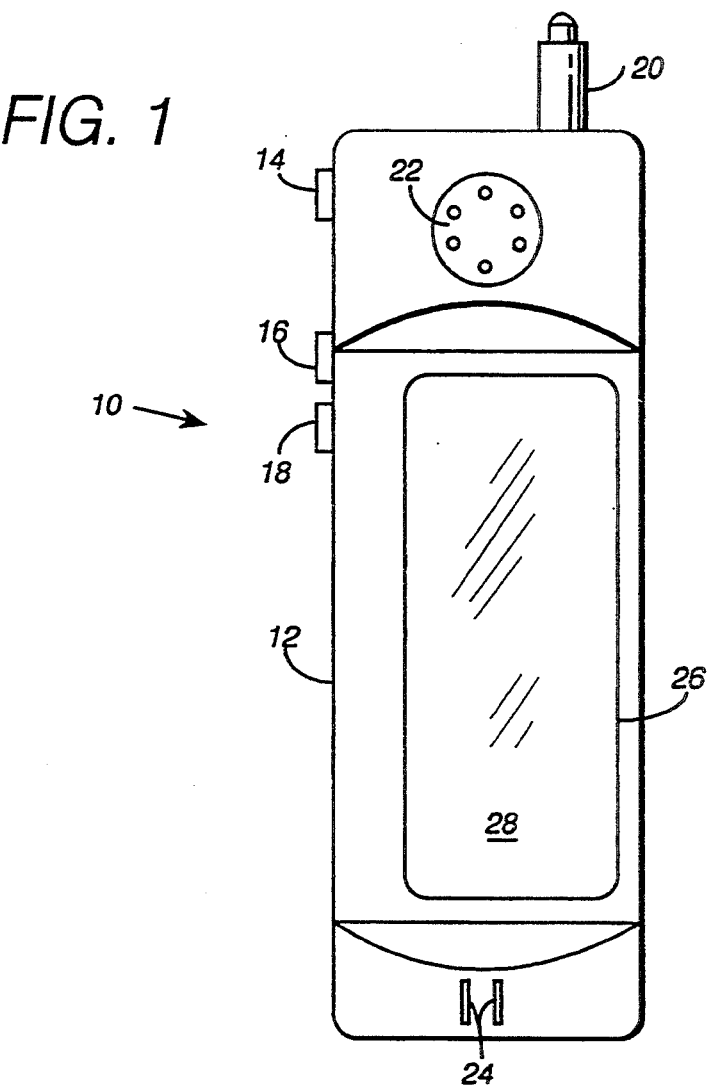
FIG. 1 is a plan view of a personal communicator embodying the invention.

Referring now to the drawings, and first to FIG. 1, a personal communicator (PC) 10 is of the type generally set forth above and comprises a cellular phone and a complete data processing system further details of which are described below. PC 10 includes a housing or casing 12 having mounted along one side thereof a plurality of external, manually operated push buttons including an ON/OFF push button 14, an UP push button 16, and a DOWN push button 18. PC 10 has a size facilitating usage as a hand-held device and buttons 16 and 18 are located so that a right handed user can wrap his/her fingers around the rear of the casing and actuate the buttons to adjust speaker volume while the user is listening to the phone speaker. A pull-out antenna 20 is mounted at the top of the casing. A speaker 22 is mounted near the top of the casing and a microphone 44 (FIG. 2) is mounted inside the bottom of the casing behind port holes 24. A touchscreen display 26 is mounted on the middle portion of the casing between the speaker and the microphone, and provides an input/output (I/O) device and user interface for entering information into and receiving information, from the PC and the data processing system therein. The general shape of PC 10 is similar to the shape of commercially available portable phones except that display 26 occupies the space normally used for a standard, electromechanical, twelve push-buttons, phone keyboard. Display 26 includes a touch sensitive overlay 28 the outer surface of which is flush with adjacent portions of casing 12.

Figure 2:
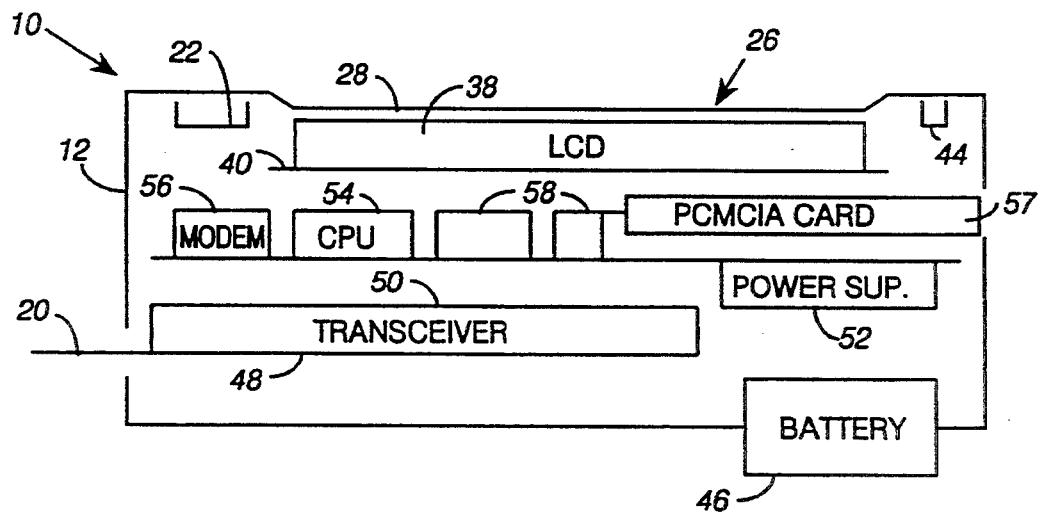
FIG. 2 is a longitudinal view through the personal communicator shown in FIG. 1, schematically illustrating various components.

Referring to FIG. 2, PC 10 has a plurality of miniaturized components mounted within casing 12. The components include speaker 22 and microphone 44 spaced apart a distance corresponding to the distance between an ear and the mouth of an average size user to facilitate use as a phone. PC 10 is battery operated and includes a battery 46 detachably mounted on the back wall of the casing. A cellular phone transceiver 48 is mounted inside casing 12 and is connected to antenna 20, the antenna being extensible outwardly from the casing for radio frequency (RF) communications. Display 26 is rectangularly shaped and comprises a touch sensitive overlay 28 that overlies a liquid crystal display (LCD) 38, and a backlight 40. The LCD has a viewing area of 36mm by 115mm and is operated as an all points addressable display. A planar card 50 is mounted within the center of casing 12 and has mounted thereon various components including a power supply 52, a central processing unit (CPU) 54 that forms the system controller (FIG. 3), a modem 56, and other components 58 including a connector for connecting and supporting an optional Personal Computer Memory Card International Association (PCMCIA) card 57 that conforms to published standards of the Association for a version 2.0 card support.

Figure 3:
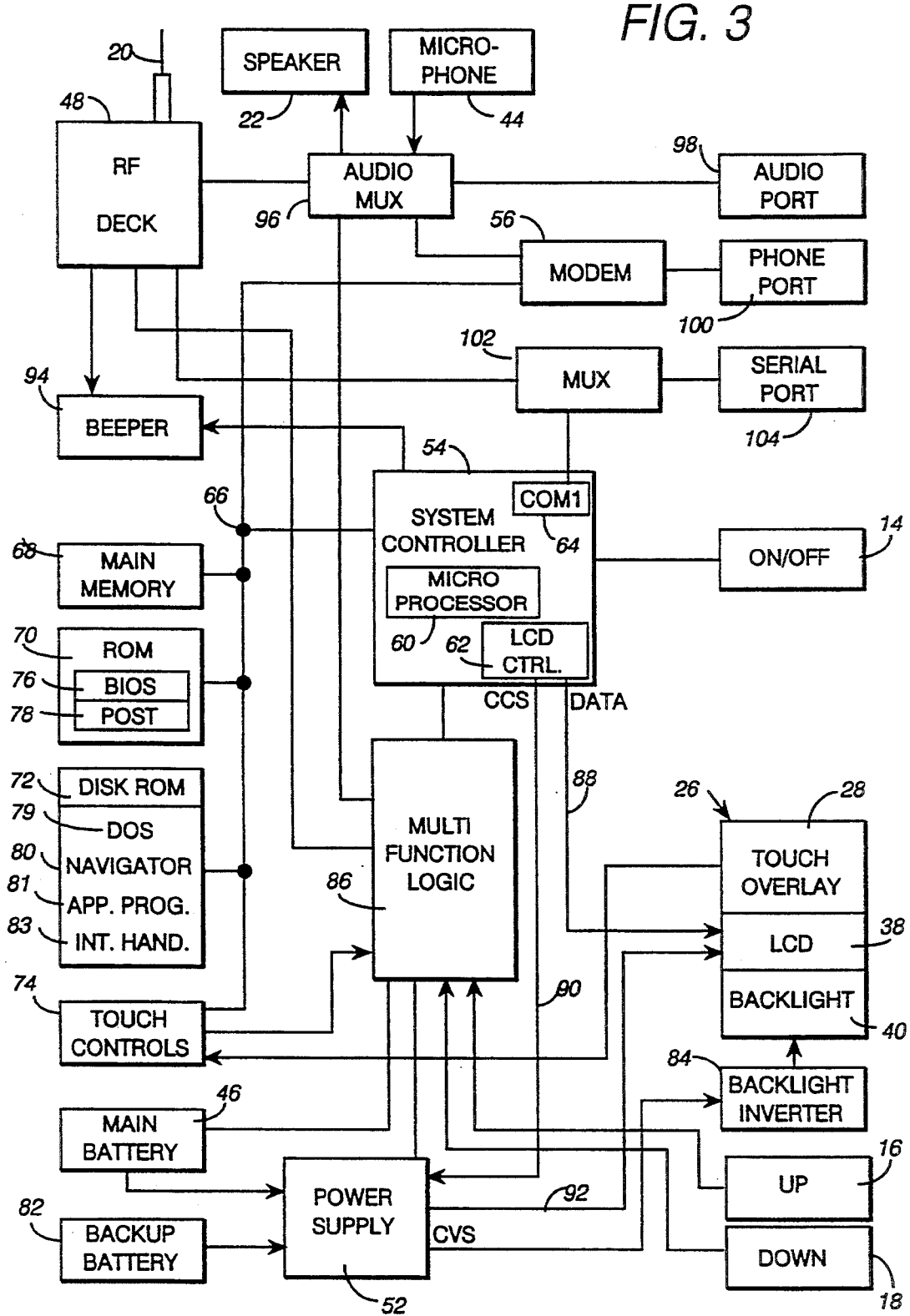
FIG. 3 is a is a block diagram of electrical components of the personal communicator shown in FIG. 1.

Referring to FIG. 3, system controller 54 is single chip implementation of a PC/XT class portable computer, the chip being a Model VG230 processor commercially available from Vadem, Inc., San Jose, Calif. Controller 54 comprises a plurality of subsystems including a microprocessor 60 for executing various programs stored in the communicator, an LCD controller 62, a COM1 communication port 64, and pinouts for connection to various devices the major ones of which are shown in FIG. 3. A bus 66 interconnects controller 54 with a main memory 68, a read only memory (ROM) 70, a disk ROM 72, touch controls 74, and modem 56.

ROM 70 stores a basic input/output system (BIOS) 76 and a power on self test (POST) program 78, and is accessed in the usual manner. Disk ROM 72, however, is accessed, in a manner that simulates a disk drive, and stores files containing a disk operating system (DOS) 79, the Navigator program 80 which is an extension to the DOS, application programs 81 that produce various communication and data processing functions in PC 10, and interrupt handlers 83 for handling interrupts specific to the applications. Additional memory and application programs can be added by the PCMCIA card. When the communicator is turned on, POST program 78 is executed. In response to a successful completion of the test, a kernel of DOS 79 is then loaded from disk ROM 72 into main memory 68, for execution. DOS 79 accesses disk ROM 72 and loads the Navigator and the application programs, as needed, into main memory 68 for execution by microprocessor 60. The Navigator controls the information displayed on the LCD, paints the various screens associated with the application programs on the LCD, and spawns new programs in response to user selection through actuation of the touchscreen interface.

Communication functions are handled by RF deck 48 and modem 56. RF deck is connected to a beeper 94 that is sounded or actuated to alert the user to an incoming call. Controller 54 is also connected to beeper 94 and is able to selectively actuate the beeper such as when a screen button is selected. Deck 48 is also connected to an audio mux 96 which controls the routing of audio signals between deck 48, speaker 22, microphone 44, modem 56, and audio port 98. Modem 56 is connected to a phone port 100 by means of which PC 10 can be connected by a cable (not shown) into a phone network or system. Deck 48 is also connected to a mux 102 that in turn is connected further to a serial port 104 and to COM1 port 64 of controller 54.

Battery 46 is connected to power supply 52 and supplies the primary power for operating PC 10. A backup battery 82 is also connected to the power supply and supplies power to volatile memory when the main battery is removed for replacement. Power supply 52 is connected to a backlight inverter 84 that, in turn, is connected to backlight 40 for controlling back lighting of the LCD to allow PC 10 to be operated under low light conditions. PC 10 preferably includes power management functions (not shown) for conserving energy usage and prolonging battery life.

LCD controller 62 is connected by a data bus 88 to supply data to LCD 38 to control the contents of the information displayed by the LCD. Controller 62 drives a contrast control signal (CCS) onto line 90 for transmission to power supply 52. In response to the CCS, power supply 52 drives a contrast voltage signal (CVS) onto line 92 that determines the contrast of LCD 38.

Touch overlay 28 is a resistive pressure sensitive overlay that produces an analog voltage signal indicative of an overlay location being pressed. Overlay 28 is connected to touch controls 74 that convert the analog signal into a digital signal representing the X,Y coordinates of the overlay location being pressed. The digital coordinates are then transmitted over bus 66 to controller 54 and memory 68 for use in determining the purpose of the location being pressed. Touch controls 74 are further connected to multifunction logic 86. In response to sensing that the overlay 28 has been touched, controls 74 generate an interrupt request that is transmitted to logic 86 and logic 86 then transmits the interrupt request to controller 54. UP and DOWN buttons 16 and 18 are also connected to logic 86 which debounces any signals due to the mechanical nature and generates a button number identifying which button has been pressed. The numbers are stored in I/O ports (not shown) which can be polled by the system. Multifunction logic 86 is also connected to RF deck 48 and audio mux 96 allowing controller 54 to communicate therewith and provide functions not done by the system controller, such functions not being germane to the invention.

Operation

Figure 4A:
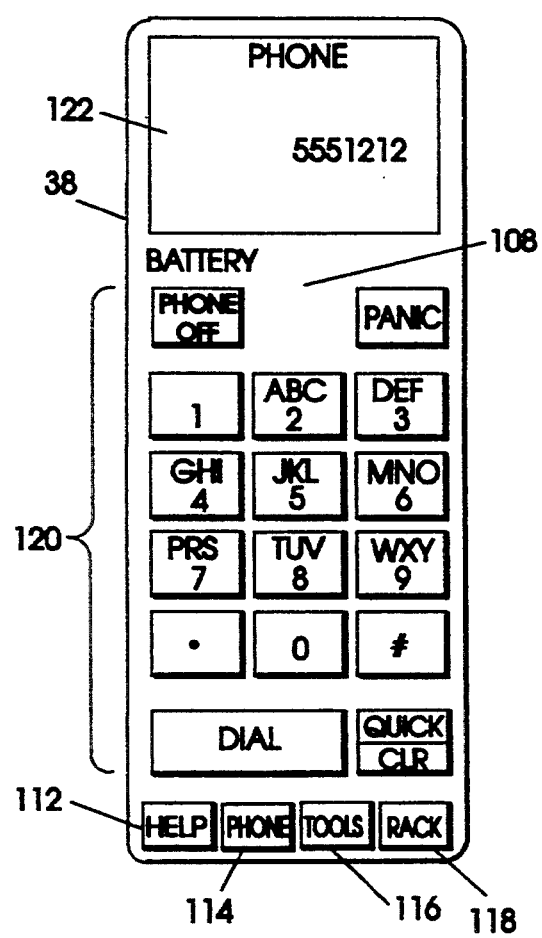
FIG. 4 is an illustration of two exemplary user interface screens, useful in understanding a first embodiment of the invention.
Figure 4B:
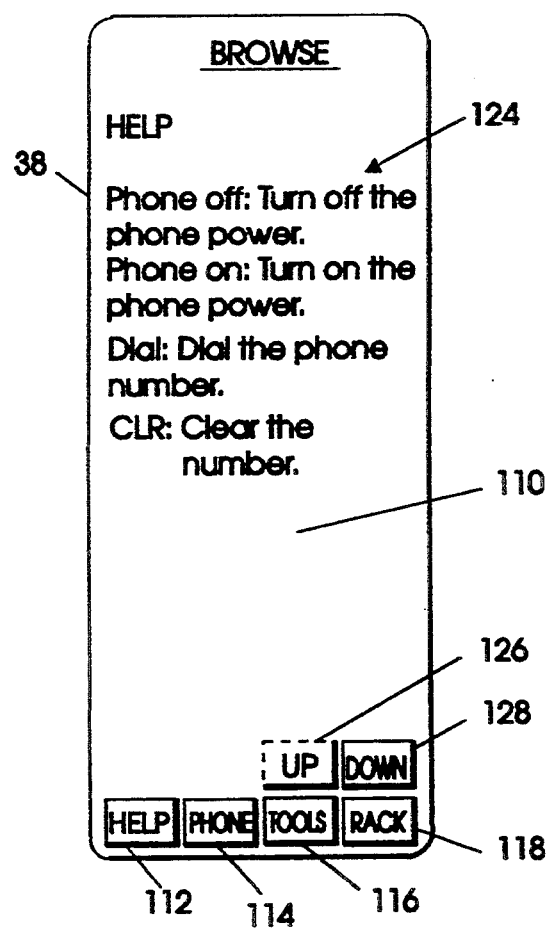

As indicated above, when PC 10 is turned on, DOS 79 and Navigator 80 are loaded into main memory 68, along with an application. By default, the first application to be loaded is a phone application that provides and controls cellular phone operations. Such application is executed and interacts with the Navigator program to create a Phone screen 108 on LCD 38, which screen is shown in FIG. 4. The various screens displayed on LCD 38 are painted by Navigator 80 using information from the specific application program to which the screen is relevant. When being used as a cellular phone, UP/DOWN buttons 16 and 18 may be used to adjust speaker volume. FIG. 4 also shows a Help screen 110 that is displayed when the HELP button 112, of screen 108, is selected.

The screens include selectable buttons having thin solid lines along their left and top edges and shadow lines along their bottom and right edges. The buttons also bear labels or icons, or both. A button is selected by a touch and release action. That is, a button is selected when the user touches overlay 28 in the area overlaying the button, and then releases the button by releasing the overlay. When a button is so touched, it is highlighted. When a button is so selected, the system sounds beeper 94 to provide audio feedback to the user. All buttons are also operated by a "last contact" method so that a user can easily recover from touching an unintended button by leaving a finger on the screen and sliding to another button or a non-button area. As a finger is slid across the overlay, new buttons are highlighted while the old buttons are returned to normal, non-highlighted conditions, thereby providing the user with visual feedback as to which button will be selected when the finger is removed from the overlay. Each application program stores one or more maps correlating the X,Y positions of the overlay with the different buttons. The Navigator scans the map, in response to receiving X,Y coordinates, to determine the function of a selected area or button, and take appropriate action.

Screen 108 includes a simulated cellular phone keyboard 120 and a data entry area 122 in which phone numbers are displayed as the respective digits of a phone number are entered by the keyboard. Screen 108 also comprises a row 111 of selectable buttons including a HELP button 112, a PHONE button 114, a TOOLS button 116, and a BACK button 118, located along the bottom edge of the screen. These four selectable buttons are common to other menu screens and appear at the same locations on screen 110 and other portrait screens. PHONE button 114 is used to transfer control to the phone application from other applications, to allow the user to place or receive a phone call regardless of the current application. TOOLS button 116 is used to transfer control to an office tools screen allowing the user to select another application. BACK button 118 is used to transfer control back to the previously selected screen(s).

Help screen 110 contains a description 124 of the functions of keys presented on screen 108, which is deemed the current screen at the time the HELP button thereof is selected. In addition to the common selection buttons 112, 114, 116, and 118, screen 110 further contains selection buttons 126 and 128 for paging up and down between pages of the information presented on the Help screen.

Contrast Control

In accordance with the first embodiment of the invention, changes in LCD contrast are made in response to the user pressing and holding the HELP button while pressing one or the other of UP/DOWN buttons 16 or 18 until the desired contrast is achieved. The user usually adjusts contrast when the communicator is first turned on at which time phone screen 108 is displayed. The HELP button is located in a predetermined position at the lower left corner of the screen. With such knowledge, should the contrast be at the extremes of opacity or transparency where the user cannot see the button, the user can readily press the area of the overlay above the LCD area where the button would normally be visible, and adjust contrast.

Figure 5:
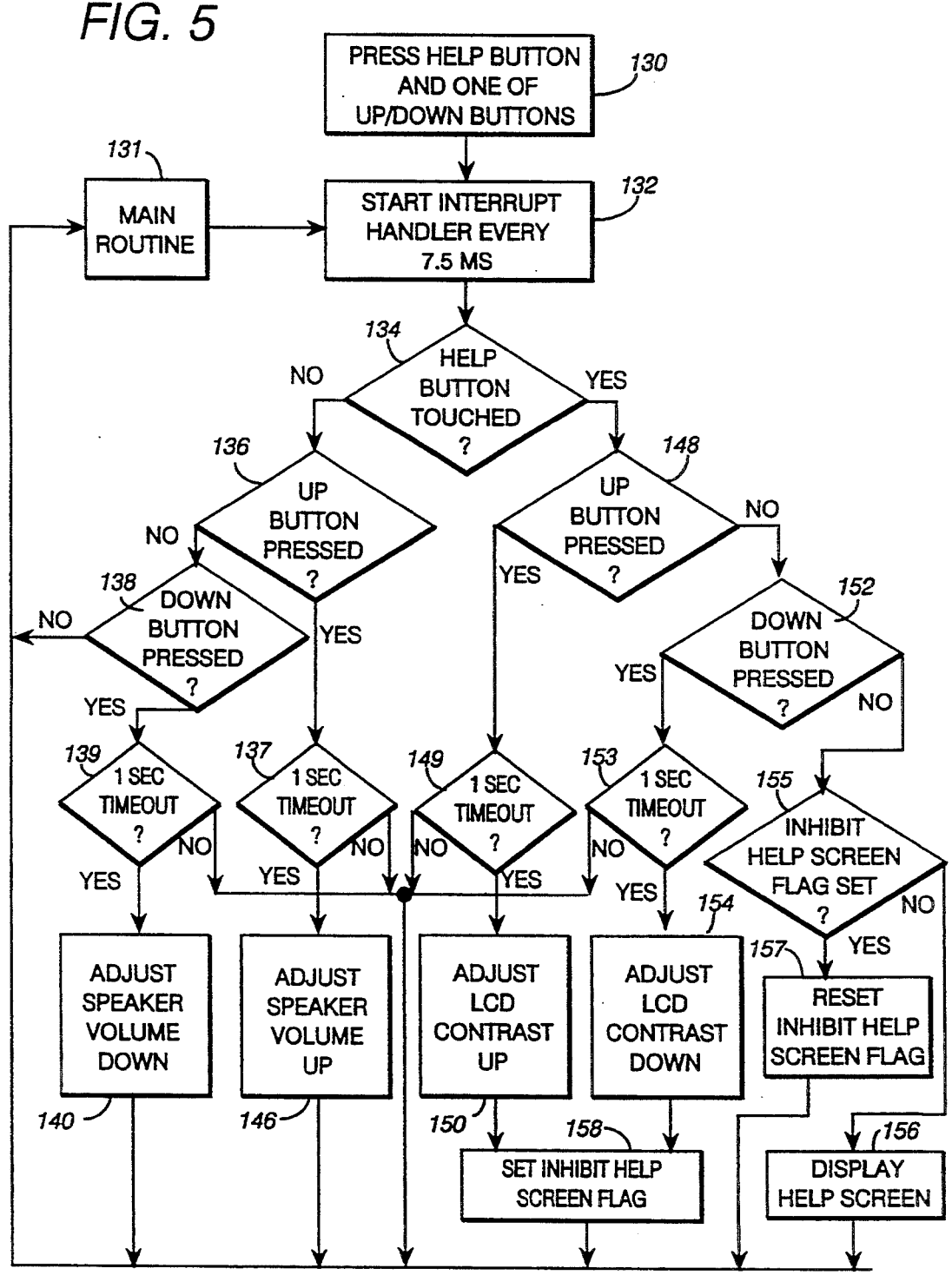
FIG. 5 is a flow chart illustrating contrast control operations of the first embodiment of the invention.

With reference to FIG. 5, assume that the communicator has just been turned on and the main routine is being executed at 131. Contrast adjustment is then done in the following manner. First, at step 130, the user touches the overlay adjacent the location of the HELP button and simultaneously presses either the UP button 16 or the DOWN button 18. When the touchscreen is pressed, an interrupt occurs every 7.5 ms and each interrupt is handled in step 132 by an interrupt handler which performs the handling and then returns control to the main routine at 131. The pressing of HELP button 112 is detected by using the X,Y positions transmitted when the touch screen is pressed, and looking up the Help function associated with the position. The UP/-

DOWN buttons are detected by polling the I/O ports for the number assigned to each button.

The handling routine decides in step 134 if the HELP button was touched. If such button was not touched (this might occur when the user wants to adjust the speaker volume), step 136 decides if the UP button 16 was pressed. If so, as indicated by the "yes" decision in the drawing, then a one second timeout period is entered at 137. So long as the UP button remains pressed, the speaker volume is adjusted incrementally up at 146, but if the button is released for more than one second, the time out period expires and the process ends at 142 with control being returned to the Navigator. If step 136 results in a negative answer, step 138 decides if the DOWN button is pressed. If so, the speaker volume is adjusted downwardly while the DOWN button is pressed. When the DOWN button is released for more than one second, the adjustment then ends.

If step 134 results in a "yes" determination, a contrast control mode of operation begins. Steps 148 and 152 determine which of the UP/DOWN buttons is being pressed or actuated, and adjusts the LCD contrast up or down in 150 or 154 dependent upon which button is pressed. Then step 158 sets an INHIBIT HELP SCREEN flag and returns to the main routine. When either button is released for more than one second, timeout decisions 149 and 153 end the contrast control mode. Should decision 152 result in a "no" decision, step 155 decides if the INHIBIT HELP SCREEN flag has been set. If not, step 156 displays the Help screen. If the flag has been set, step 157 resets the flag prior to the next interrupt. If only the HELP button had been pressed in 130, each of decisions 148, 152, and 155 result in a negative decisions, and step 156 displays a Help screen upon release of the Help button at which time it is considered "selected".

Figure 6:
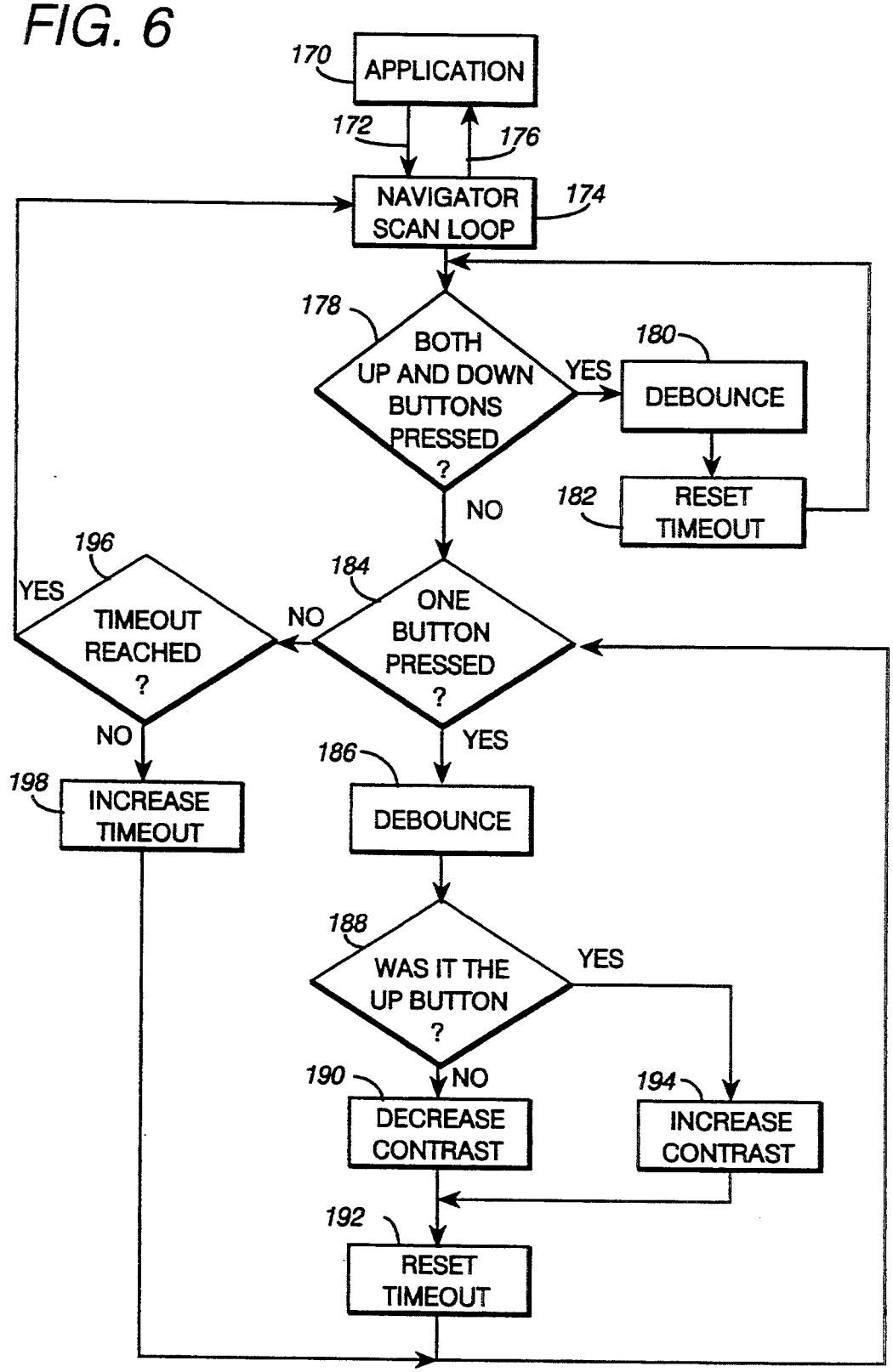
FIG. 6 is a flow chart illustrating contrast control operations of a second embodiment of the invention.

FIG. 6 shows a second embodiment of the invention in which contrast adjustment is made in response to first pressing both UP/DOWN buttons 16 and 18 to enter into contrast adjustment mode, and thereafter pressing only one of such buttons to select the direction of adjustment. When the application is executing at 170 and reaches a point where a button input is needed, control passes via 172 to the Navigator which performs a scan loop and senses touchscreen positions and polls button ports. If, for example, a user selects a single button then by 176, control is returned to the application programs to process the selection. However, if, as part of the loop, step 178 detects that both buttons 16 and 18 are pressed simultaneously, the Navigator then enters into contrast adjustment mode, in which step 180 debounces the button signals, and step 182 resets a timeout to zero. Then, once the contrast mode is entered, the user can release one or both keys. If neither key is then pressed, a decision is made in 196 to determine if the time out period has expired. If so, control returns to the Navigator, and the contrast adjustment mode is exited. If the timeout has not expired step 198 incrementally increases the timeout and a new decision 184 is made to see if a button is yet pressed. If one button is pressed, step 186 debounces the signal, and step 188 decides if it was the up button or the down button, and steps 190 or 194 would then adjust contrast according to which button. Step 192 would then reset the timeout and return to 184 to continue the operation until the contrast adjustment mode is exited.

The advantages of both embodiments are that each allows a user to adjust contrast without providing a contrast button specifically dedicated to only adjusting contrast, and that each can be used when the LCD contrast is initially opaque or transparent and the user cannot read data on the LCD screen.

It should be apparent to those skilled in the art that many changes can be made in the details and arrangements of steps and parts without departing from the scope of the invention as defined in the appended claims.

What is claimed is:

1. A mobile, compact personal communicator including a data processing system and a communication device for performing a wide variety of data processing and communication functions comprising:

a casing of a size adapted to be held in the hand of a user;

a touchscreen display mounted on said casing and including a liquid crystal display (LCD) coupled with a touch sensitive overlay;

first and second selectively actuated push buttons mounted on said casing;

a cellular phone mounted on said casing and including a speaker having adjustable volume;

speaker volume control means connected to said first and second buttons and to said speaker for increasing and decreasing said volume of said speaker in response to selective actuation of said first and second buttons respectively;

processing means mounted in said casing, said processing means including screen management means for painting different screens on said display device with contrast control means; and said contrast control means connected to said LCD for controlling contrast of said LCD, said contrast control means comprising:

selectively actuated first means in a screen for switching said communicator into a contrast control mode of operation and converting the first and second buttons from speaker volume control to contrast control of the display in response to said first means being actuated, second means, operative during said contrast mode of operation, for increasing the contrast of said LCD in response to said first push button being actuated, and third means, operative during said contrast mode of operation, for decreasing the contrast of said LCD in response to said second push button being actuated.

2. A personal communicator in accordance with claim 1 wherein said first means comprises:

a selectively actuated touchscreen button in a predetermined location on said screen in said touchscreen display; and fourth means for switching into said contrast control mode in response to simultaneous actuation of said touchscreen button and one of said push buttons.

3. A personal communicator in accordance with claim 2 comprising:

fifth means for displaying a Help screen on said display in response to touching and releasing said touchscreen button at a time other than during said contrast control mode.

4. A personal communicator in accordance with claim 3 wherein:

said touchscreen button is actuated by touching said touchscreen display, and said contrast control mode is ended in response to said touchscreen display being released; and said communicator further comprises means for inhibiting display of said Help screen in response to releasing said touchscreen display to end said contrast control mode.

5. A personal communicator in accordance with claim 4 wherein said touchscreen button comprises a HELP button in a screen displayed on said LCD and an area of said overlay immediately adjacent to said HELP button.

6. A personal communicator in accordance with claim 2 comprising:

said touchscreen button comprises a simulated button displayed in the screen on said LCD, and an area of said overlay located adjacent to said simulated button, said button being actuated by touching said area of said overlay;

the data processing means mounted in said casing comprising:

fifth means for indicating that said area of said overlay is being touched, polling means for respectively identifying said push buttons when such buttons are actuated, interrupt means for periodically generating an interrupt in response to said touchscreen display being touched, and interrupt handling means for handling said interrupt, said interrupt handling means being operative to scan said polling means and said fourth means and operate said second means and said third means when said touchscreen button is touched and said push buttons are selectively actuated.

7. A personal communicator in accordance with claim 1 wherein said first means comprises fourth means responsive to simultaneous actuation of both said first push button and said second push button for switching into said contrast control mode, whereby contrast changes are effected in response to a sequence of first actuating both push buttons and then selectively actuating one of said first or second push buttons.

8. A personal communicator in accordance with claim 7 comprising: timeout control means responsive to actuation of said push buttons to end said contrast control mode when neither push button has been actuated for a predetermined period of time.

9. A personal communicator in accordance with claim 7 comprising:

the data processing means mounted in said casing including polling means for identifying which push buttons have been actuated;

said data processing means further comprising fifth means for selectively operating said first means and said second means when said polling means indicates that one of said push buttons has been actuated.

10. A personal communicator including a data processing system, a communication device with one or more operating buttons, and a touch controlled liquid crystal display, the method of controlling contrast in the liquid crystal display, comprising the steps of:

a) generating a screen including a button image in the display using a screen management means included in the data processing system;

b) determining if the button image was touched in the display;

c) determining if an operating button was depressed, if the button image was touched, and whether the operating button indicated an increase or decrease in the level of contrast for the display; and d) adjusting the contrast level of the display in accordance with the operating button depressed.

11. The method of claim 10 further comprising the steps of:

a) determining if an operating button was depressed, if the button image was not touched, and whether the operating button indicated an increase or decrease in a level of volume for a speaker included in the communication device; and b) adjusting the volume of the speaker in accordance with the operating button depressed.

12. The method of claim 10 wherein there is a first operating and a second operating button and the method comprises the further steps of:

a) determining if both the first and second operating buttons have been depressed;

b) initiating a contrast adjustment mode in the data processing system when both operating buttons have been depressed;

c) releasing one of the operating buttons; and d) changing the contrast of the display according to the depressed operating button.

13. The method of claim 12 further comprising the steps of:

a) increasing the contrast of the display when the first operating button is in a depressed state after the second operating button has been released; and b) decreasing the contrast of the when the second button is in a depressed state after the first operating button has been released.

14. The method of claim 12 wherein a time out control means is included in the data processing system and the method comprises the further step of terminating the contrast adjustment mode when neither operating button has been depressed for a predetermined period.

15. The method of claim 12 further comprising the step of setting an INHIBIT HELP SCREEN flag in the data processing system after the contrast has been adjusted for the display.

* * * * *